United States Patent
Wysocki et al.

(10) Patent No.: US 10,408,130 B2
(45) Date of Patent: Sep. 10, 2019

(54) MIXING SYSTEM

(71) Applicant: ANSALDO ENERGIA SWITZERLAND AG, Baden (CH)

(72) Inventors: Stefan Wysocki, Zurich (CH); Holger Luebcke, Loerrach (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 476 days.

(21) Appl. No.: 15/148,432

(22) Filed: May 6, 2016

(65) Prior Publication Data

US 2016/0326962 A1 Nov. 10, 2016

(30) Foreign Application Priority Data

May 8, 2015 (EP) ..................... 15166956

(51) Int. Cl.
*F02C 7/22* (2006.01)
*F23R 3/16* (2006.01)
*F23R 3/06* (2006.01)
*F23R 3/28* (2006.01)
*F02C 7/04* (2006.01)

(52) U.S. Cl.
CPC ............... *F02C 7/22* (2013.01); *F02C 7/04* (2013.01); *F23R 3/06* (2013.01); *F23R 3/16* (2013.01); *F23R 3/286* (2013.01); *F23R 2900/03341* (2013.01)

(58) Field of Classification Search
CPC ...... F02C 7/22; F02C 7/04; F23R 3/06; F23R 3/286; F23R 3/16; F23R 2900/03341
USPC ........................................... 60/783
See application file for complete search history.

(56) References Cited

U.S. PATENT DOCUMENTS

| | | | | |
|---|---|---|---|---|
| 3,514,955 A | * | 6/1970 | Judge | F02K 1/386 137/605 |
| 4,813,230 A | * | 3/1989 | Braithwaite | F02K 1/386 181/220 |
| 5,235,813 A | * | 8/1993 | McVey | F23R 3/12 431/181 |
| 5,265,807 A | * | 11/1993 | Steckbeck | F02K 1/48 181/213 |
| 5,315,815 A | | 5/1994 | McVey et al. | |
| 5,638,675 A | * | 6/1997 | Zysman | F02K 1/386 181/220 |

(Continued)

FOREIGN PATENT DOCUMENTS

| | | |
|---|---|---|
| EP | 2 383 455 A2 | 11/2011 |
| WO | WO 2014/029512 A2 | 2/2014 |

OTHER PUBLICATIONS

Search Report dated Oct. 14, 2015, by the European Patent Office for Application No. 15166956.

*Primary Examiner* — J. Todd Newton
(74) *Attorney, Agent, or Firm* — Buchanan Ingersoll & Rooney PC

(57) ABSTRACT

This application describes a mixing system for a gas turbine combustor arrangement, the mixing system including a lobed mixer and a wall, enclosing a fluid flow path, wherein the lobed mixer is arranged in the wall, between a first part of the wall and a second part of the wall, and wherein the first part of the wall and the second part of the wall are spaced apart in the direction of a lobed mixer axis. Details of the lobed mixer and a method of mixing two flows in a mixing system are also described.

14 Claims, 3 Drawing Sheets

(56) References Cited

U.S. PATENT DOCUMENTS

| | | | | |
|---|---|---|---|---|
| 5,761,900 | A * | 6/1998 | Presz, Jr. | F02K 1/36 |
| | | | | 239/265.17 |
| 6,276,127 | B1 * | 8/2001 | Alberti | F02K 1/386 |
| | | | | 60/262 |
| 8,528,337 | B2 | 9/2013 | Berry et al. | |
| 9,745,919 | B2 * | 8/2017 | Di Paola | F02K 1/386 |
| 9,995,245 | B2 * | 6/2018 | Dindar | F02K 1/48 |
| 2005/0100846 | A1 | 5/2005 | Gutmark et al. | |
| 2009/0184181 | A1 | 7/2009 | Berry et al. | |
| 2011/0126512 | A1 * | 6/2011 | Anderson | F02K 1/386 |
| | | | | 60/262 |
| 2011/0265447 | A1 * | 11/2011 | Cunningham | F02K 1/48 |
| | | | | 60/264 |
| 2015/0000285 | A1 * | 1/2015 | Deiss | F02C 7/22 |
| | | | | 60/740 |
| 2015/0159876 | A1 | 6/2015 | Freitag et al. | |
| 2016/0326962 | A1 * | 11/2016 | Wysocki | F23R 3/286 |

* cited by examiner

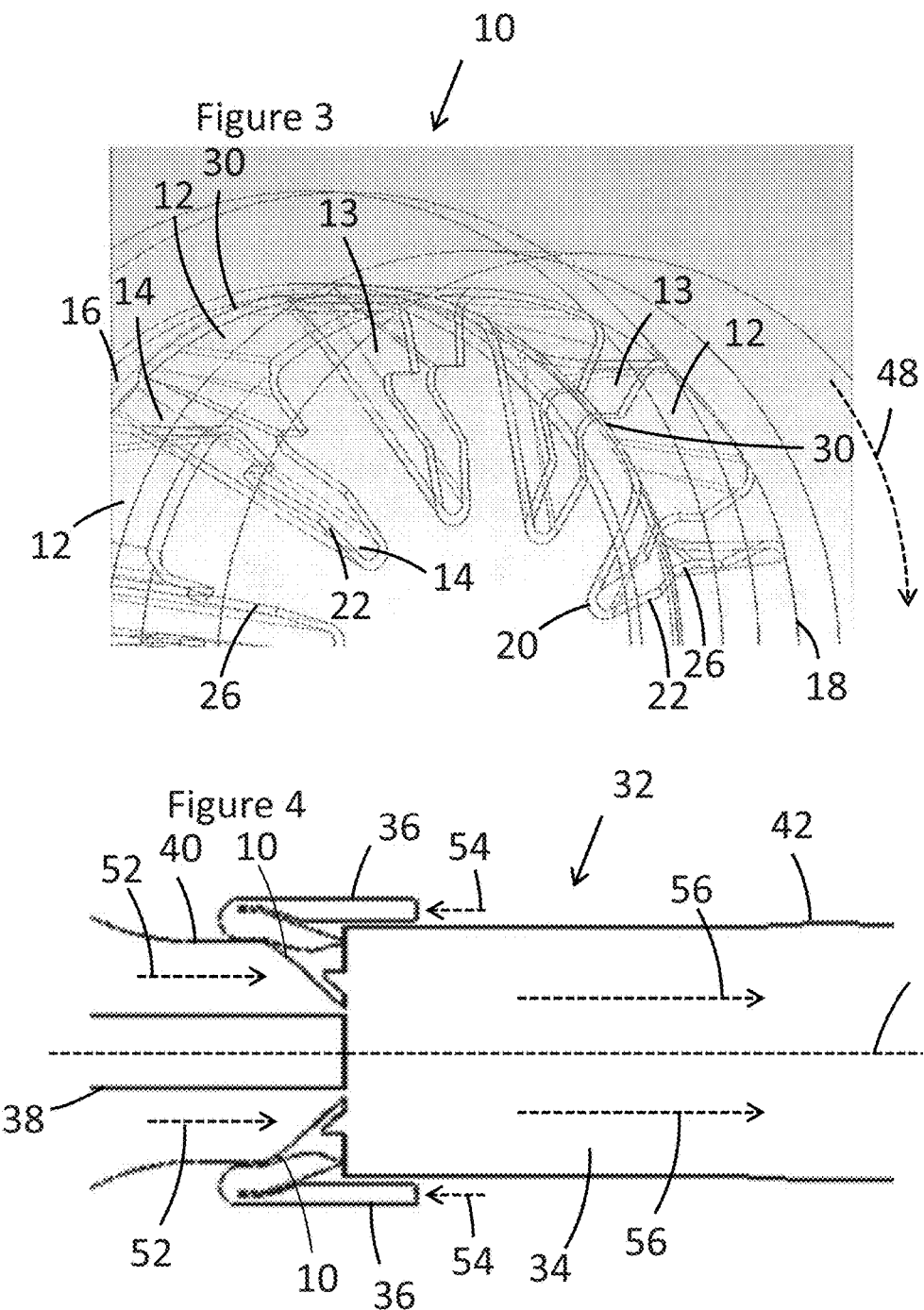

MIXING SYSTEM

TECHNICAL FIELD

The present disclosure relates to combustors for gas turbines, and particularly to combustors comprising lobed mixers.

BACKGROUND OF THE INVENTION

Gas turbine combustors work under extreme conditions, and as such have increasingly complex cooling systems, designed to maximise cooling and minimise cooling air use. In general, air management is an important consideration in combustor design, since air is used both as an oxidiser in the combustion process and to provide cooling to hot gas path components of the combustor. In order to ensure maximum efficiency of the gas turbine engine, leakages and pressure drops in air distribution should be minimised. In addition, it is important to minimise the complexity of the system for maintenance, thermal expansion and accessibility of hot gas path components. Increasing requirements in gas turbine efficiency demand continuing improvement of components to maximise performance. In light of these various requirements, it has been appreciated that changes could be made to improve combustor performance.

SUMMARY OF THE INVENTION

The invention is defined in the appended independent claims to which reference should now be made. Advantageous features of the invention are set forth in the dependent claims.

A first aspect provides a mixing system for a gas turbine combustor arrangement, the mixing system comprising a lobed mixer and a wall enclosing a fluid flow path, wherein the lobed mixer is arranged in the wall between a first part of the wall and a second part of the wall, and wherein the first part of the wall and the second part of the wall are spaced apart in the direction of a lobed mixer axis.

The lobed mixer can provide a rapid and low pressure drop mixer for two or more streams such as a fuel stream and an air stream, and can provide a good compromise between pressure loss and mixing quality. It will generally provide a lower pressure drop than mixers with cross flow injection as it provides in line injection, which can minimise pressure loss between the first and second combustor stages. This low pressure drop can be used to reduce the overall pressure drop of the system, or alternatively the pressure can be used to further enhance the mixing process. Injection in line (rather than cross flow injection) can add energy into the system, accelerating the first stage combustor flow, thereby creating a suction effect on the first stage.

The lobed mixer can also simplify gas turbine design, allowing the application of a lobe structure to replace conventional mixing devices in gas turbine systems. It can allow integration of components by combining sealing and mixing functionality into one part, and/or by removing the need for a seal. The lobed mixer can effectively act as a seal between combustor liner and mixer volume wall or sequential burner—there is no longer any need to seal the gap as the fluid flow through the gap can effectively purge the gap. This can result in improved air utilisation, as there is no seal leakage or seal cooling flow.

With the lobed mixer, it may be possible to reduce the necessary cooling surface, so the combustor arrangement can be shortened compared to existing designs. The combination of two parts (seal and mixer, specifically hula seal) into one new part can also save space. The lobed mixer can remove the need for additional cooling air for cooling hot gas path components. The lobed mixer can help force/guide mixing of two streams for advanced flow control/exit pattern and for improved control of sequential burner fuel injection. The lobed mixer can reduce swirl in the hot gas flow from the first stage combustor. The lobed mixer can also reduce wear and provide structural damping, as the shape allows for some deformation of parts (e.g. first stage and sequential stage) during gas turbine start up and turn down.

In an embodiment, the lobed mixer extends in a circumferential direction around a lobed mixer axis.

In an embodiment, the first part of the wall is a first stage combustor wall and the second part of the wall is a mixer volume wall, or wherein the first part of the wall is a mixer volume wall and the second part of the wall is a sequential combustor wall, or wherein the first part of the wall is a first stage combustor wall and the second part of the wall is a sequential combustor wall.

In an embodiment, the lobed mixer comprises outer lobes, inner lobes and lobe sidewalls connecting the outer lobes and the inner lobes, and wherein the lobed mixer extends from an upstream end to a trailing edge.

In an embodiment, the distance between adjacent outer lobes is less than the width of the inner lobes.

In an embodiment, the upstream end is a plate extending in the direction of a lobed mixer axis.

In an embodiment, the trailing edge comprises at least one cut-out. Cut-outs can be used to enhance turbulence generation, and can therefore enhance mixing performance.

A second aspect provides a gas turbine comprising the mixing system of claim 1.

A third aspect provides a method of mixing two flows in a mixing system for a gas turbine combustor arrangement, the mixing system comprising a lobed mixer and a wall enclosing a fluid flow path, wherein the lobed mixer is arranged in the wall between a first part of the wall and a second part of the wall, and wherein the first part of the wall and the second part of the wall are spaced apart in the direction of a lobed mixer axis, comprising the steps of feeding a first flow to be mixed through the lobed mixer, feeding a second flow to be mixed through the lobed mixer, and mixing the first flow and the second flow after the first flow and the second flow exit the lobed mixer. In an embodiment, the first flow is a hot gas flow and the second flow is an air flow.

BRIEF DESCRIPTION OF THE DRAWINGS

An embodiment of the invention will now be described by way of example only and with reference to the accompanying drawings in which:

FIG. 3 is a perspective line diagram of an alternative lobed mixer with cut-outs in the trailing edge;

FIG. 4 is a cross-section view of part of a combustor arrangement with a lobed mixer with cut-outs in the trailing edge;

DETAILED DESCRIPTION OF THE PREFERRED EMBODIMENTS

Figure 1:
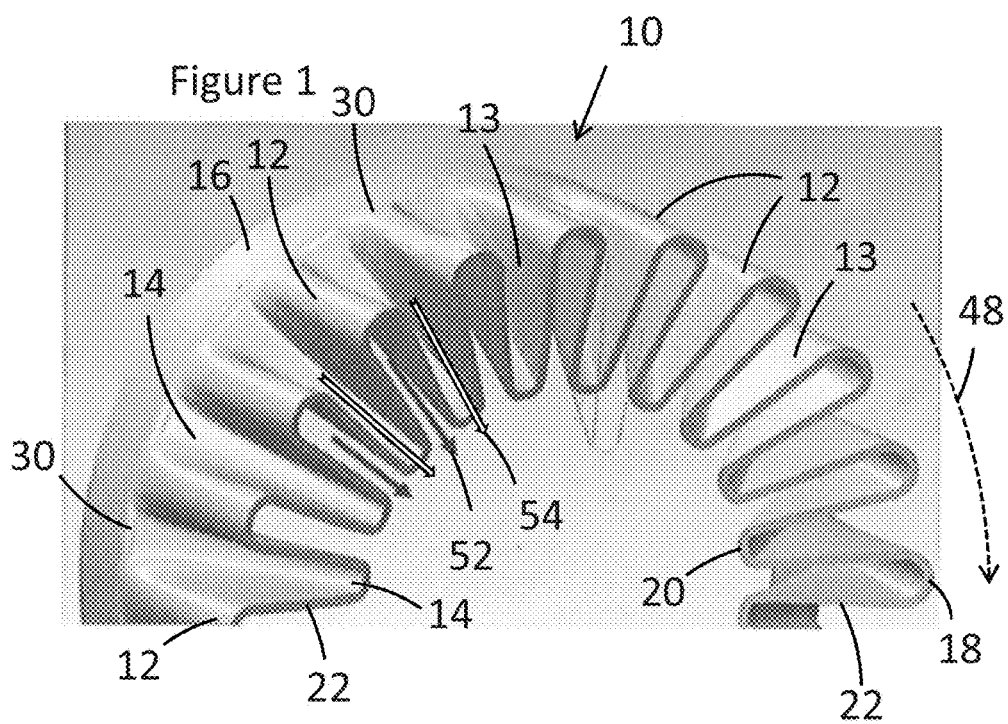
FIG. 1 is a perspective view of a lobed mixer.

FIG. 1 shows a lobed mixer 10 comprising a plurality of lobes 12, 14 extending from an upstream end 16 to a downstream end (trailing edge) 18, 20, 22. The lobes comprise outer lobes 12, lobe sidewalls 13 and inner lobes 14. The lobes extend in the direction of the lobed mixer axis 50 (see FIG. 4). The inner lobes 14 also extend in a radial direction with respect to the lobed mixer axis 50, whereas the outer lobes 12 typically extend parallel to the lobed mixer axis 50.

The trailing edge comprises outer lobe portions 18, inner lobe portions 20 and lobe sidewalls 22. The upstream end 16 generally extends in a circumferential direction 48 with respect to the lobed mixer axis 50.

The lobes are split into three portions: outer lobes 12, inner lobes 14 and lobe sidewalls 13. This is described in more detail below with reference to FIGS. 5 and 6.

Figure 2:
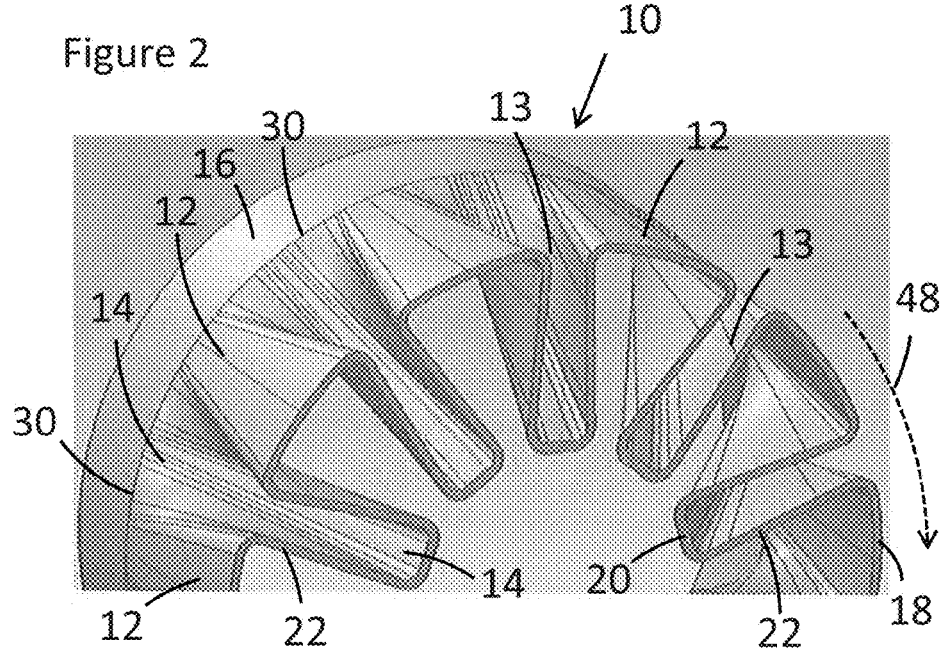
FIG. 2 is a perspective view of an alternative lobed mixer.

FIG. 2 shows an alternative lobed mixer 10, with the same features as FIG. 1 but differently shaped lobes. The similarities and differences between the lobes of FIGS. 1 and 2 are now described.

In FIG. 1, the outer lobe trailing edge portion 18 and the inner lobe trailing edge portion 20 describe half or about half of a circle, typically slightly more than half a circle for the outer lobe trailing edge portion 18 and slightly less than half a circle for the inner lobe trailing edge portion 20. The outer lobes 12 and the inner lobes 14 consequently describe or substantially describe a portion of a cylinder (hemicylindrical), although the end of the outer 12 and inner 14 lobes may diverge from a cylindrical shape close to the upstream end 16. In FIG. 2, in contrast, the outer lobe trailing edge portion 18 and the inner lobe trailing edge portion 20 are almost straight, with a slight curvature to follow the circumferential direction 48 relative to the lobed mixer axis 50. The outer lobes 12 and the inner lobes 14 are consequently substantially planar, again with a slight curvature in the circumferential direction 48.

In FIG. 1, the gap between adjacent outer lobe trailing edge portions 18 is larger than the gap between adjacent inner lobe trailing edge portions 14. In FIG. 2, the gap between adjacent outer lobe trailing edge portions 18 is smaller than the gap between adjacent inner lobe trailing edge portions 14. The relative distances across these gaps are also the relative distances between outer lobes 12 and the inner lobes 14.

In FIGS. 1 and 2, the width of the outer lobe trailing edge portions 18 is larger than the width of the inner lobe trailing edge portions 14. Similarly, the width of the outer lobes 12 is greater than the width of the inner lobes 14.

The lobed mixer of FIG. 2 extends a greater percentage of the distance from the upstream end 16 to the lobed mixer axis 50 than the lobed mixer 10 of FIG. 1 (greater penetration depth).

In general, the various different features of the lobed mixers of FIGS. 1 and 2 can be mixed in different combinations to provide a wide range of options.

FIG. 3 shows another alternative lobed mixer 10, with the features described above but with differently shaped lobes. The lobes show some of the features of the embodiment of FIG. 1 and some of the features of the embodiment of FIG. 2. In addition, cut-outs 26 are provided in the lobe sidewalls 13.

FIG. 4 shows a mixing system 32, comprising a fluid flow path 34, a lobed mixer 10, a lobed mixer inlet 36 (a secondary function of the mixing air/second flow is the cooling of the mixer volume wall 32) and a central lance 38, through which additional air or fuel can be injected; this can reduce the required penetration depth of the lobe mixer. The hot gas flow 52 and the second flow 54 are also shown; the second flow can act both as a cooling fluid flow and as a mixer flow. The lobed mixer 10 is arranged in a gap extending in the hot gas flow direction between a first stage combustor liner 40 and mixer volume wall 42. The first stage combustor liner 40 and the mixer volume wall 42 make up the wall of the fluid flow path. The mixer volume wall 42 encloses a mixer volume, with the mixer volume being part of the fluid flow path 34.

Figure 5:
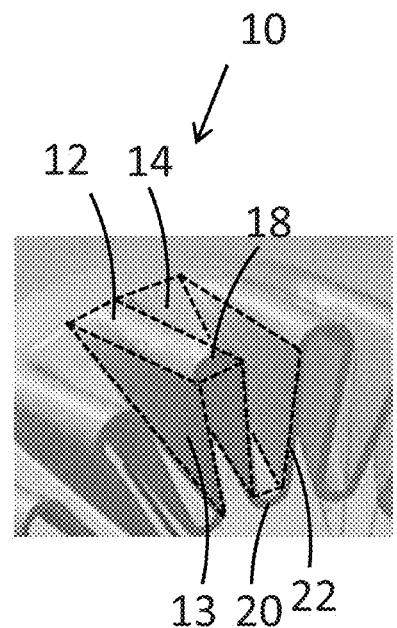
FIG. 5 shows part of the lobed mixer of FIG. 1 with dotted lines delineating the features of the lobes.
Figure 6:
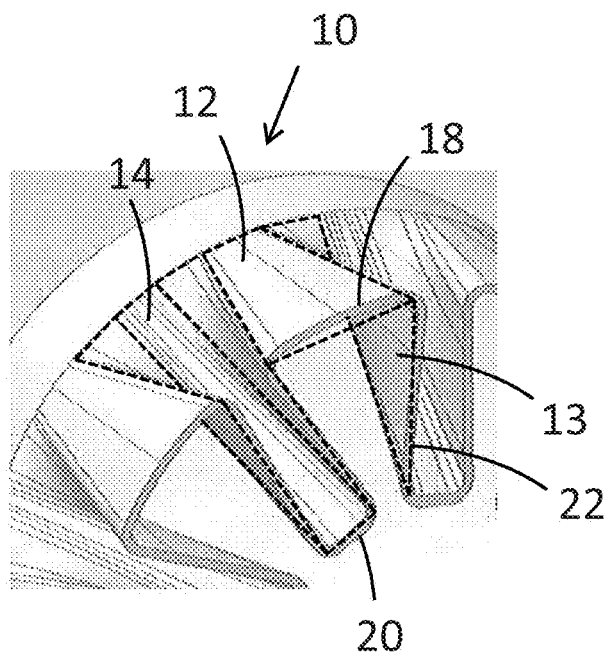
FIG. 6 shows part of the lobed mixer of FIG. 2 with dotted lines delineating the features of the lobes.

For clarity, FIGS. 5 and 6 show part of FIGS. 1 and 2 with additional dotted lines, roughly showing the extent of the outer lobe 12, the lobe sidewall 13 and the inner lobe 14. The outer lobes 12 are arranged in a ring around the lobed mixer axis 50. The inner lobes 14 are arranged in a smaller ring around the lobed mixer axis 50 (i.e. closer to the lobed mixer axis than the outer lobes). The lobe sidewalls connect the outer lobes 12 and the inner lobes 14.

In a method of using a lobed mixer 10 in a mixing system 32 as described above, a second flow 54, which is a fluid such as air, is fed into the lobed mixer 10, optionally via a lobed mixer inlet 36. The second flow 54 passes through the lobed mixer 10, specifically between lobe sidewalls 13 and the inner lobe 20 (see FIG. 1). Part or all of the hot gas flow 52 also passes through the lobed mixer 10, specifically between the lobe sidewalls 13 and the outer lobe 22 (see FIG. 1). The hot gas and the second flow exit the lobed mixer 10 past the trailing edge 18, 20, 22, mixing after exiting.

Optionally, the fluid (second flow) cools at least one other combustor component prior to passing through the lobed mixer, such as a sequential liner or a sequential piece.

The lobed mixer may be used in a combustor arrangement or a burner of a gas turbine, for example, such as a stationary gas turbine or an aero-engine. The lobed mixer can be used in sequential combustion systems, such as a CPSC (constant pressure sequential combustion) system. The lobed mixer can be retrofitted into existing gas turbines. The combustor arrangement could comprise a first stage combustor, a second stage combustor and a mixing volume in between the first and second stage combustors.

The lobed mixer is arranged in a combustor arrangement between two combustor components, in other words the lobed mixer is arranged between two parts of a wall enclosing a fluid flow path. The lobed mixer is therefore in a gap between a first part of the wall and a second part of the wall, with the gap extending in the lobed mixer axis direction. The first part of the wall and the second part of the wall would not normally overlap in the lobed mixer axis direction; that is, the first part of the wall and the second part of the wall are spaced apart in the lobed mixer axis direction. Turning again to the example of FIG. 4, the first part of the wall in this example would be the first stage combustor liner 40, and the second part of the wall would be the mixer volume wall 42.

The lobed mixer 10 can be located between a first stage combustor and a mixer volume 42 in order to inject mixing air (the second flow) into the hot gas stream 52 from the first stage. In this location, the lobed mixer can also fulfil the function of a seal to allow for thermal expansion of the different parts. Alternatively, the lobed mixer 10 can be located between a mixer volume and a sequential combustor, or between two combustion stages without a mixer volume in between. In the latter case, the lobed mixer can be used to introduce a fuel such as a fuel gas into the second stage combustor (sequential combustor).

The lobed mixer 10 is preferably made as one integral part. The lobed mixer may extend part or all of the way round the lobed mixer axis 50. In embodiments where the lobed mixer only extends parts of the way round the lobed mixer axis 50, two or more lobed mixers may be arranged together to form a complete ring. The lobed mixer 10 may be annular (a ring extending in a circumferential direction 48 relative to the lobed mixer axis) or may be another shape such as rectangular, for example in cases where the lobed mixer is used adjacent to non-annular components.

The lobed mixer typically extends straight from the upstream end to the trailing edge, but may also deviate from a direct path.

The lobed mixer may be attached to one or more of the components adjacent to it (e.g. the first and second parts of the wall). In particular, the upstream end would generally be attached to the component adjacent to it (the sequential liner in the example in FIG. 4), to minimise or avoid leakage between the upstream end and the adjacent component. Typically, the lobed mixer is at least in contact with the first part of the wall and/or the second part of the wall. The relative position of the parts may also change during use, for example due to thermal expansion.

The outer lobes 12 are shown in the Figures as extending parallel or substantially parallel to the lobed mixer axis, but they may also extend at an angle from the lobed mixer axis.

The lobe sidewalls 13 are typically planar or substantially planar, but may also be other shapes.

The inner lobes 14 normally extend in the direction of the lobed mixer axis and in a radial direction with respect to the lobed mixer axis 50; in some embodiments, the outer lobes 16 also extend in a radial direction with respect to the lobed mixer axis 50. In any case, the trailing edge 18 of the outer lobes would be further from the lobed mixer axis than the trailing edge 20 of the inner lobes.

In contrast to the examples given above, the width of the outer lobe trailing edge portions 18 could be smaller than the width of the inner lobe trailing edge portions 14. In one embodiment, the distance between adjacent outer lobe portions (in a circumferential direction 48 relative to the lobed mixer axis) is less than the width of the inner lobe portions (in a circumferential direction 48 relative to the lobed mixer axis).

The inner and/or outer lobes may be planar or substantially planar, though typically the inner and outer lobes would curve slightly in a circumferential direction relative to the lobed mixer axis, as shown for example in FIG. 2. The inner and/or outer lobes may also curve substantially as shown for example in FIG. 1.

The smoothed join at the point where the inner and outer lobes in FIG. 2 meet the lobe sidewalls is optional, and an angled join could also be used rather than a smoothed join.

The outer lobes 12 and the inner lobes 14 are typically arranged in a ring around the lobed mixer axis 50, although other arrangements are also possible. Although the outer lobes are all shown as being the same in the examples in the Figures, different outer lobes within the same lobed mixer may be different shapes. Similarly, different inner lobes within the same lobed mixer may be different shapes, and different lobe sidewalls within the same lobed mixer may be different shapes.

When in use, the upstream end 16 is normally upstream of the trailing edge 18, 20, 22 in the hot gas flow direction and also relative to the second flow direction.

In the Figures, the upstream end 16 is shown as a plate that extends in the circumferential direction and is attached to the lobes. The plate is optional; alternatively, the upstream end is the end of the lobes distal from the trailing edge, and the upstream end does not extend in the lobed mixer axis direction. When a plate is provided, the plate preferably extends in or substantially in the lobed mixer axis direction, but may also be angled from the lobed mixer axis direction.

The plate may be planar, conical (conical frustum) or another shape. The plate extends away from the lobes, and preferably extends at least 0.2 to 2 times as far and most preferably at least 0.3 to 1 times as far (in the lobed mixer axis direction) as the lobes. The lobes end at the point where the outer lobe and inner lobe are the same distance from the lobed mixer axis (marked as join 30 in the Figures). The upstream end is preferably attached to a part of the wall, and/or the upstream end may overlap a part of the wall (in the lobed mixer axis direction). The trailing edge may be attached to a part of the wall.

The upstream end is preferably curved, and typically extends in a circumferential direction relative to the lobed mixer axis 50. The outer and inner lobes can be perpendicular to the lobed mixer axis at the trailing edge, but may also be angled in some applications (such as the examples in the Figures), for example for tuning. In general, the angle of the lobe sidewalls relative to the lobed mixer axis may be varied during design depending on the application—for example, the lobe sidewalls 13 in FIG. 1 extend in a radial or substantially radial direction relative to the lobed mixer axis, whereas the lobe sidewalls in FIG. 2 are at an angle from the radial direction. Any two adjacent lobe sidewalls are preferably symmetrical along a line between them in the radial direction.

The trailing edge 18, 20, 22 can extend in a plane perpendicular to the lobed mixer axis, or can be at a different angle. If the trailing edge is perpendicular to the lobed mixer axis, the trailing edge is generally in or largely in a single plane perpendicular to the lobed mixer axis. If the trailing edge is not perpendicular to the lobed mixer axis, the trailing edge would generally fit on or largely on the surface of a cone. The trailing edge follows a meandering line on the plane or the cone. If cut-outs are provided, the cut-outs would normally deviate significantly from the plane or cone. The trailing edge may have a different shape to that shown in the examples in the Figures; for example, the trailing edge may have a sinusoidal shape, as may the lobes themselves, in which case the lobe sidewalls could continue the curvature of the inner lobes and outer lobes.

In FIG. 1, it can be seen that the lobed mixer has a penetration depth (extent in a direction perpendicular to the lobed mixer axis) of approximately half the distance from the furthest point on the lobed mixer from the lobed mixer axis to the lobed mixer axis. In FIG. 2, it can be seen that the trailing edge extends further, covering a majority of the distance.

The number of lobes, the penetration depth, the inner lobe angle relative to the lobed mixer axis and the outer lobe angle relative to the lobed mixer axis can all be chosen during the design phase to control the pressure drop and mixing characteristics of the lobed mixer.

The cut-outs 26 are in the trailing edge, and generally in the lobe sidewall trailing edge portion. The cut-outs are deviations from the general direction of the lobe sidewall trailing edge portion, where the trailing edge in the cut-out is closer to the upstream end than the rest of the trailing edge. The cut-outs can be various shapes. One or more cut-outs may be provided, with cut-outs on some or all of the lobe sidewalls, and cut-outs of more than one size or shape may be provided on the same lobed mixer. More than one cut-out may be provided on the same lobe sidewall trailing edge portion. The cut-outs preferably extend (in the lobed mixer axis direction) at least 10% as far as the lobes extend, and more preferably at least 25% as far. The cut-outs preferably extend at most 75% as far as the lobes extend, and more preferably 50% as far as the lobes extend.

The lobed mixer inlet 36 is optional; air may enter directly from a cooling channel to the lobed mixer. When included, a lobed mixer inlet may extend around part or all of the circumference of the fluid flow path. Two or more separate lobed mixer inlets may be provided, spaced around part of all of the circumference of the fluid flow path. Typically, the second flow 54 enters the lobed mixer inlet 36 in a direction opposite to the direction of the hot gas flow 52. The lobed mixer inlet can be designed so that the second flow direction is switched to the direction of the hot gas flow before the second flow enters the lobed mixer, as is shown in FIG. 4, or can alternatively be designed so that the second flow enters the lobed mixer in a different direction, such as in a radial direction towards the lobed mixer axis 50. The lobed mixer inlet can be attached to one or more adjacent components, such as to a part of the wall enclosing the fluid flow path and/or to the lobed mixer. The second flow can be used to cool the sequential liner and mixer volume wall. The second flow is therefore normally directed along the wall of the component downstream of the lobed mixer in the hot gas flow direction (so the mixer volume wall 42 in FIG. 4, for example), where it acts as a cooling flow before entering the lobed mixer.

The join 30 may be a join where two separate parts are fixed together, or the lobed mixer may be formed as a single integral part.

The fluid flow path 34 may be a hot gas flow path for hot gases from a first stage combustor, for example.

The central lance 38 is optional. One or more central lances may be provided.

The hot gas flow 52 could be a hot gas flow from a previous stage. Depending on the location in the combustor arrangement, a fuel flow or an air flow could be provided instead of a hot gas flow, for example. The second flow could be air, gaseous fuel or steam, for example. More generally, any two or more flows could be mixed, such as two of hot gas, cooling air, gaseous fuel, steam, and compressed air.

Various modifications to the embodiments described are possible and will occur to those skilled in the art without departing from the invention which is defined by the following claims.

REFERENCE NUMERALS 10 lobed mixer
12 outer lobe
13 lobe sidewall
14 inner lobe
16 upstream end
18 outer lobe trailing portion
20 inner lobe trailing edge portion
22 lobe sidewall trailing edge portion
26 cut-out
30 join
32 mixing system
34 fluid flow path
36 lobed mixer inlet
38 central lance
40 first stage combustion liner
42 mixer volume wall
48 circumferential direction
50 lobed mixer axis
52 hot gas flow
54 second flow
56 mixed flow

The invention claimed is:

1. A mixing system for a gas turbine combustor arrangement, the mixing system comprising:
a lobed mixer and a wall enclosing a fluid flow path, wherein the lobed mixer is arranged in the wall between a first part of the wall and a second part of the wall, and wherein the first part of the wall and the second part of the wall are spaced apart in a direction of a lobed mixer axis, wherein the lobed mixer includes outer lobes, inner lobes and lobe sidewalls connecting the outer lobes and the inner lobes, wherein the lobed mixer extends from an upstream end to a trailing edge, and a gap between opposing radially outermost lobe trailing edge surfaces of opposing lobe sidewalls of adjacent outer lobes has a width that is smaller than a width of the gap between opposing radially innermost surfaces of the opposing lobe sidewalls.

2. The mixing system of claim 1, wherein the lobed mixer extends in a circumferential direction around the lobed mixer axis.

3. The mixing system of claim 1, comprising:
a first stage combustor wall, wherein the first part of the wall is the first stage combustor wall; and
a mixer volume wall, wherein the second part of the wall is the mixer volume wall.

4. The mixing system of claim 1, wherein the distance between adjacent outer lobes is less than the width of the inner lobes.

5. The mixing system of claim 1, wherein the upstream end is a plate extending in the direction of the lobed mixer axis.

6. The mixing system of claim 1, wherein the trailing edge comprises:
at least one cut-out.

7. The mixing system of claim 1, wherein the mixing system comprises:
a central lance.

8. A gas turbine comprising:
the mixing system of claim 1.

9. The mixing system of claim 1, comprising:
a mixer volume wall, wherein the first part of the wall is the mixer volume wall; and
a sequential combustor wall, wherein the second part of the wall is the sequential combustor wall.

10. The mixing system of claim 1, comprising:
a first stage combustor wall, wherein the first part of the wall is the first stage combustor wall; and
a sequential combustor wall, wherein the second part of the wall is the sequential combustor wall.

11. The mixing system of claim 1, wherein the width of a gap between opposing radially outermost lobe upstream surfaces of opposing lobe sidewalls of adjacent outer lobes is larger than a width of the gap between the opposing radially outermost lobe trailing edge surfaces of opposing lobe sidewalls of the adjacent outer lobes.

12. A method of mixing two flows in a mixing system for a gas turbine combustor arrangement, the mixing system including:
a lobed mixer and a wall enclosing a fluid flow path, wherein the lobed mixer is arranged in the wall between a first part of the wall and a second part of the wall, and wherein the first part of the wall and the second part of the wall are spaced apart in a direction of a lobed mixer axis, wherein the lobed mixer includes outer lobes, inner lobes and lobe sidewalls connecting the outer lobes and the inner lobes, wherein the lobed mixer extends from an upstream end to a trailing edge, and a gap between opposing radially outermost lobe trailing edge surfaces of opposing lobe sidewalls of adjacent outer lobes has a width that is smaller than a width of the gap between opposing radially innermost surfaces of the opposing lobe sidewalls, the method comprising:

feeding a first flow to be mixed through the lobed mixer, feeding a second flow to be mixed through the lobed mixer, and mixing the first flow and the second flow after the first flow and the second flow exit the lobed mixer.

13. The method of claim 12, in which the first flow is a hot gas flow and the second flow is an air flow.

14. The A mixing system for a gas turbine combustor arrangement, the mixing system comprising:

a lobed mixer and a wall enclosing a fluid flow path, wherein the lobed mixer is arranged in the wall between a first part of the wall and a second part of the wall, and wherein the first part of the wall and the second part of the wall are spaced apart in a direction of a lobed mixer axis, wherein the lobed mixer includes outer lobes, inner lobes and lobe sidewalls connecting the outer lobes and the inner lobes, wherein the lobed mixer extends from an upstream end to a trailing edge, and a width of a gap between opposing radially outermost lobe upstream surfaces of opposing lobe sidewalls of adjacent outer lobes is larger than a width of the gap between opposing radially outermost lobe trailing edge surfaces of opposing lobe sidewalls of the adjacent outer lobes.

* * * * *